F. W. JOELL.
FRONT WHEEL HOLDER FOR BICYCLES AND MOTOR CYCLES.
APPLICATION FILED OCT. 4, 1913.
1,121,843. Patented Dec. 22, 1914.
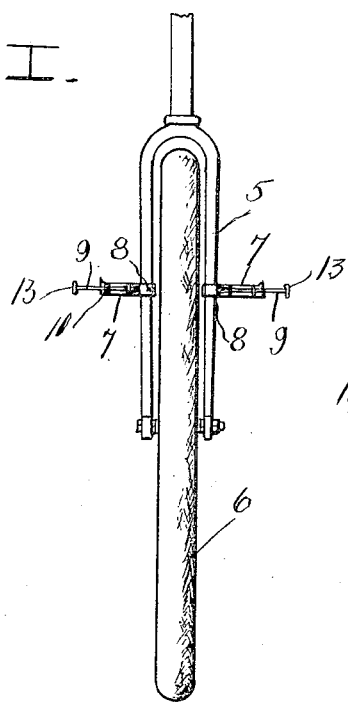
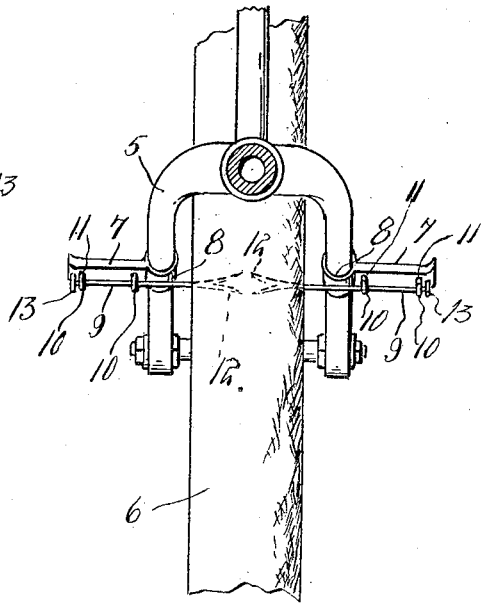
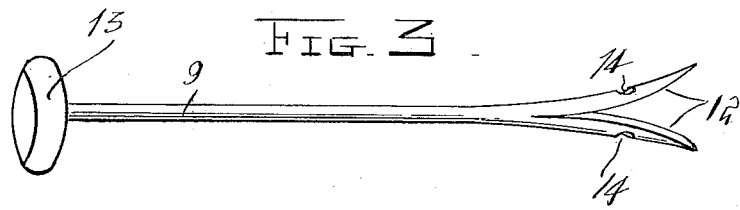
Witnesses
Inventor
F. W. Joell.
By
Attorneys

UNITED STATES PATENT OFFICE.

FREDERICK W. JOELL, OF HAMILTON, BERMUDA.

FRONT-WHEEL HOLDER FOR BICYCLES AND MOTOR-CYCLES.

1,121,843.  Specification of Letters Patent.  Patented Dec. 22, 1914.

Application filed October 4, 1913. Serial No. 793,443.

*To all whom it may concern:*

Be it known that I, FREDERICK W. JOELL, a subject of the King of Great Britain, residing at Hamilton, in the parish of Pembrooke, island of Bermuda, have invented certain new and useful Improvements in Front-Wheel Holders for Bicycles and Motor-Cycles; and I do hereby declare the following to be a full, clear, and exact description of the invention, such as will enable others skilled in the art to which it appertains to make and use the same.

This invention relates to new and useful improvements in bicycle attachments and relates particularly to means for holding the bicycle or motorcycle in an upright position.

The object of the present invention resides in the provision of means carried by the bicycle and adapted to engage the front wheel to prevent it from rotating, said means being so designed that it may be withdrawn from operative engagement and held in said withdrawn position against rattling.

A further object of the invention is to provide such a device which is easily operated and which comprises a minimum number of parts so that it is durable in use and may be manufactured at a comparatively low cost.

With these and other objects in view, the invention consists in the novel combination, formation and arrangement of parts to be described and illustrated in the accompanying drawings and particularly pointed out in the claims hereto appended.

Reference is had to the accompanying drawings wherein similar characters of reference designate corresponding parts throughout the several views, and in which:

Figure 1 is a front elevation of a bicycle showing the improved holding means associated therewith, Fig. 2 is a top plan view of the holding device in operative position, and Fig. 3 is a perspective view of the sliding bar of the holding device.

Referring now more particularly to the drawings, 5 designates the front forks of a bicycle and 6 the usual front wheel supported therebetween. Footrests 7 are secured to the arms of the fork by clamp bands 8. These foot rests in addition to serving their normal function form a support for the wheel holding means.

For holding the bars 9 comprising the wheel engaging members, eyes 10 are provided having shanks 11 by means of which they are held adjacent and in spaced relation to the outer edges of the foot rests. The bars 9 terminate at their ends in divergent resilient furcations 12 which when the bar is moved inwardly engage the spokes of the front wheel to prevent it from turning, a knob 13 being provided on the other end of the arm to facilitate moving the same.

The bars 9 are held against detachment from their supports when withdrawn, or in non-locking position by notches 14 in the furcations 12, which engage the innermost eyes 10 and prevent the further outward movement of the bars.

From the foregoing it will be observed that a very simple and efficient structure has been provided which will perform all of the functions normally required thereof.

What is claimed is:

1. The combination with a support adapted to be attached to the frame of a bicycle, of a member slidably mounted on the support and adapted to engage the spokes of a wheel of the bicycle to prevent its rotation, and means for holding the member against sliding movement.

2. The combination with a support adapted to be attached to the frame of a bicycle, of eye members projecting from the support, a bar slidable in said members and terminating at one end in resilient furcations, said furcations having notches adapted to engage one of the eyes to hold the bar against movement.

In testimony whereof, I affix my signature, in the presence of two witnesses.

F. W. JOELL.

Witnesses:
C. W. McCALLAN,
W. H. McKEEN.

Copies of this patent may be obtained for five cents each, by addressing the "Commissioner of Patents, Washington, D. C."